United States Patent Office 3,233,613
Patented Feb. 8, 1966

3,233,613
METHOD AND APPARATUS FOR RECLAIMING DEFECTIVE CIGARETTE ASSEMBLIES AND THE LIKE
Kurt A. Körber, Hamburg, Bergedorf, and Hans Martin Thürey, Hamburg-Lohbrugge, Germany, assignors to Hauni-Werke Korber & Co. K.G., Hamburg-Bergedorf, Germany, a company of Germany
Filed Dec. 12, 1962, Ser. No. 244,072
Claims priority, application Great Britain, Dec. 15, 1961, 44,990/61; Dec. 19, 1961, 45,401/61
30 Claims. (Cl. 131—20)

This invention relates to a method and apparatus for reclaiming valuable material from defective cigarette assemblies and the like, and more particularly to a method of breaking such assemblies into the constituent elements and of collecting the elements separately, and to apparatus for performing the method.

While the invention will hereinafter be discussed with specific reference to cigarettes equipped with filter mouthpieces, it is generally concerned with the problem of reclaiming tobacco from defective cigarettes, cigars, cigarillos and like elongated assemblies of a tobacco bearing body with another element substantially free from tobacco such as a mouthpiece with or without a filter. The problem is of substantial economical significance in the manufacture of cigarettes and the like where tobacco bodies are assembled with cigarette elements free from tobacco, and the assemblies are then inspected for defects. The tobacco of the defective assemblies is still valuable even if the other elements have to be discarded.

Effective methods are available for the separation of the tobacco from an envelope of cigarette paper, and such methods are being employed for reclaiming the tobacco content of ordinary cigarettes not having a mouthpiece. This invention therefore aims at an effective method of separating the tobacco body, which may also include an envelope of cigarette paper, from those elements of a cigarette which would substantially affect the taste of the cigarette smoke if admixed to the tobacco even in small amounts.

A more specific object of this invention is the provision of an effective method and apparatus for reclaiming tobacco from units consisting of two approximately cylindrical tobacco bodies and a coaxially interposed filter plug. Such units are intermediate products in the most commonly employed process for the manufacture of filter cigarettes. The tobacco bodies are attached to the filter plug by a sleeve of paper adhesively secured to the plug and to those portions of the tobacco bodies axially adjacent the plug. The assembled units are split into two filter cigarettes by cutting the plug into two equal axial halves.

If the filter cigarettes are inspected after the splitting operation, and the rejects are to be broken apart so that the tobacco may be reclaimed, it is necessary to distinguish carefully between the two axial end portions of the cigarette in order to avoid admixture of filter material to the reclaimed tobacco. It is an additional object of the invention to avoid any possibility of such admixture by inspecting the assembled groups prior to splitting, and to break the assemblies into their constituent elements.

Even so, it is necessary that the assembled units or groups of elements enter the breaking station with their constituent parts oriented in a predetermined manner. It has been common practice heretofore to collect rejects from the inspection or testing station of a filter cigarette machine, and to break the rejects in a separate breaking station to which the collected rejects were carried in batches. The defective cigarettes are ejected from automatic testing equipment on modern cigarette making machinery in a precisely predictable orientation in space.

A further object of the invention is to simplify the breaking operation and the separate collecting of the tobacco bodies and of the tobacco-free elements of the rejected cigarettes by locating the breaking and sorting equipment directly on the cigarette making machinery adjacent the testing station where the rejects may be received in the breaking equipment in proper position.

It is conventional to convey assembled units of tobacco bodies and filter plugs in a continuous stream while they are juxtaposed in the stream and elongated transversely of the direction of stream movement. We have found that rejects are most advantageously broken into their component parts while moving transversely to the direction of elongation, that is, in the same manner as in the normal path. The rejects are diverted from that normal path at the testing station and broken while moving away from the testing station. The several portions of the assembly may be severed from each other by cutting implements, or simply by moving the several portions relative to each other, for example, by moving them at different speeds in the same direction, or in different directions at the same speed or at different speeds.

The cigarette assemblies found free from defects pass the testing station and may be collected for packaging in a manner not further relevant to this invention. The paths of the good cigarette assemblies and of the defective assemblies part at the testing station. Other features and many of the attendant advantages of this invention will be readily appreciated as the same becomes better understood by reference to the following detailed description of preferred embodiments when considered in connection with the accompanying drawings wherein:

Referring now to the drawing in detail, and initially to FIGS. 1 to 4, there is seen a hopper 1 of rectangular cross section whose side walls 2 and 3 arcuately approach each other in a downward direction to define the length of a rectangular discharge opening not much longer than the length of an assembled group or unit G consisting of two rod-shaped bodies of tobacco $T_1$, $T_2$ and of a double filter plug F. The groups G are downwardly discharged into the hopper 1 from the inspection station of a cigarette making machine in a manner more fully described hereinafter. The tobacco bodies $T_1$, $T_2$ are received from the machine in respective wrappers of cigarette paper, and are joined end to end with the interposed filter plug F by means of an adhesively secured paper sleeve V which extends longitudinally or axially a small distance beyond both ends of the plug F.

Figure 1:
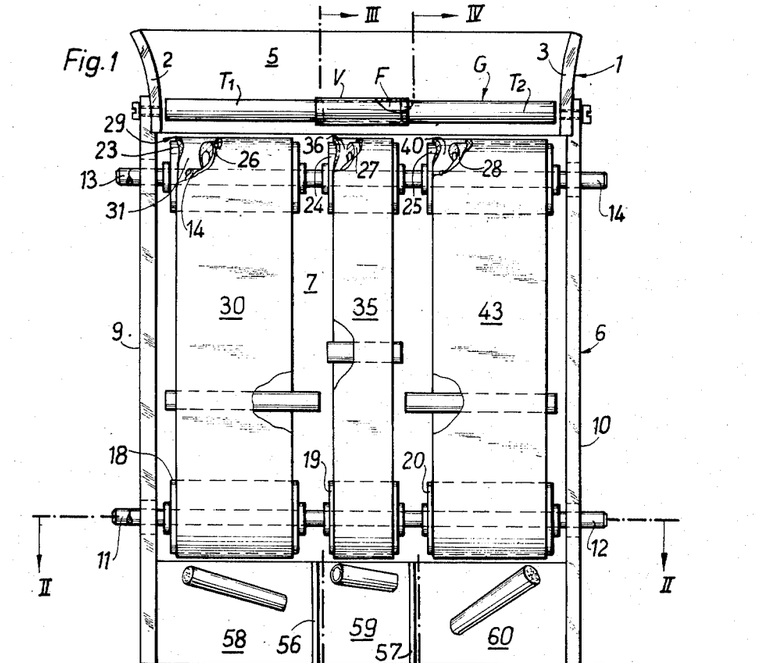
FIG. 1 is a front elevational view of a device for breaking asssembled groups or units of tobacco bodies and double filter plugs and for sorting the broken pieces, the rear wall of the apparatus and certain drive elements being removed for a better view of the actual working elements.

The front wall 4 and rear wall 5 of the hopper 1 approach each other in a downward direction to make the width of the discharge opening of hopper 1 somewhat more than the thickness of a unit G, but less than twice that thickness. Units G dropped into the hopper thus are discharged downwardly with their axes oriented in a predetermined manner.

Figure 2:
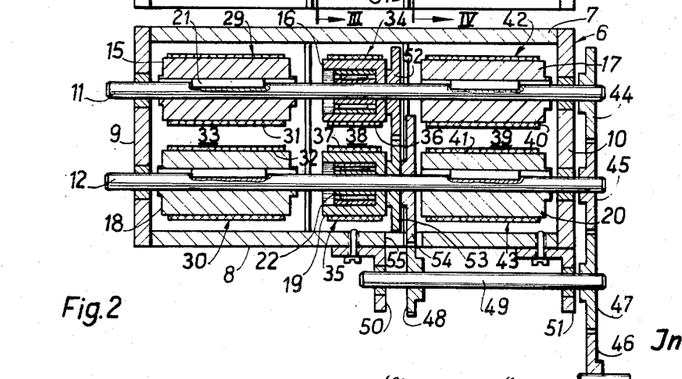
FIG. 2 shows the device partly illustrated in FIG. 1 in a sectional plan view taken on the line II—II.

The hopper 1 is mounted on top of a housing 6 having a front wall 8, a rear wall 7, and two side walls 9, 10, but lacking a top or bottom wall. Two parallel shafts 11, 12 are journaled in the side walls 9, 10 near the bottom of the housing 6, and are driven by the main drive of the associated cigarette machine in a manner more fully to be described hereunder. Two idler shafts 13, 14 are rotatably mounted between the side walls 9, 10 near the top of the housing 6 and are respectively vertically aligned with the driven shafts 11, 12. Each shaft 11 to 14 carries two axially relatively wide rollers 15, 17; 18, 20; 23, 25; 26, 28; and a narrower roller 16, 19, 24, 27 between the wider rollers. All rollers have the same diameter. The wider drive rollers 15, 17 and 18, 20 are secured to the respective driven shafts 11, 12 by keys 21, whereas the narrower rollers 16, 19 are freely rotatable on these shafts on needle bearings 22. The corresponding idler rollers 23 to 28 are mounted on the shafts 13, 14 in the same manner as the rollers on the driven shafts 11, 12.

Four wide flat belts 29, 30, 42, 43 are respectively trained over paired rollers 15, 23; 17, 25; 18, 26; and 20, 28; and two narrower flat belts 34, 35 are trained over the rollers 16, 24 and 19, 27 respectively.

The descending runs 31, 32 of the belts 29, 30 are arranged spacedly adjacent each other and jointly define a conveyor channel 33 vertically aligned with the position of the tobacco bodies $T_1$ passing through the open bottom of the hopper 1. The descending runs 36, 37 of the narrower belts 34, 35 similarly constitute a conveyor channel 38 for the filter plugs F, and the descending runs 40, 41 of the wide belts 42, 43 form a conveyor channel 39 downwardly extending from the position of a tobacco body $T_2$ of unit being discharged from the hopper 1.

The lower portion of the housing 6 is divided by two partition walls 56, 57 to form the orifices of three discharge chutes 58, 59, 60. The chutes 58, 59, 60 are vertically aligned with the channels 33, 38, 39 respectively.

The drive mechanism for actuating movement of the six belts is best seen in FIG. 2. The portions of the shafts 11, 12 projecting outward of the housing 6 through the side wall 10 carry meshing spur gears 44, 45 of equal diameter. The spur gear 45 also meshes with an intermediate gear 47 fastened on a countershaft 49 which is journaled in brackets 50, 51 on the outside of the housing 6. The countershaft 49 is rotated by a spur gear 46 which is an element of the main drive of the cigarette machine, not otherwise shown, and meshes with the spur gear 47. The countershaft 49 also carries a second spur gear 48.

The narrow roller 16 has a spur gear 52 coaxially attached thereto. The gear 52 is freely rotatable on the shaft 11. The narrow roller 19 similarly carries a spur gear 53 meshing with the gear 52 and of equal pitch diameter, and a relatively large gear 54 which projects through an opening 55 in the housing 6, and meshes with the smaller second gear 48 on the countershaft 49. The pitch circles of the several gears of the drive mechanism are selected in such a manner that the wide belts 29, 30, 42, 43 travel at a common speed which is higher than the speed of the narrow belts 34, 35.

The aforedescribed apparatus operates as follows:

The falling units or assembled groups G are oriented by the walls of the hopper 1 in the common plane of the channels 33, 38, 39 and are approximately parallel to the several shafts 11, 12, 13, 14. A very precise parallel alignment is not necessary. As each unit G enters the housing 6, the two tobacco bodies $T_1$, $T_2$, the diameter of which is greater than the spacing of the descending belt runs 31, 32 and 40, 41 are gripped between the belts and conveyed downward in the channels 33, 39 at a speed greater than the rate of downward travel of the filter plug F in the channel 38, the plug being held between the belt runs 36 and 37, and forced to travel at their slower speed.

The two tobacco bodies $T_1$, $T_2$ are thus severed from the plug F by shearing forces applied at right angles to the longitudinal axis of the assembled group, and the component elements of the group are separately discharged from the bottom of the housing 6 through respective chutes 58, 59, 60 for re-processing of the tobacco bodies $T_1$, $T_2$ in a known manner, and for disposal of the filter plugs F which are not usually reprocessed. The connecting sleeves V usually adhere to the plug F even if they were securely fastened to the inner end portions of the tobacco bodies $T_1$, $T_2$, and are discarded with the plug. If the assembled group is rejected for defects other than faulty adhesion of the connecting sleeve V to the tobacco bodies, the sleeve is torn and a minor portion thereof follows the tobacco bodies to the next operation in which the tobacco is separated from the cigarette paper as well as from the paper of the connecting sleeve.

The modified embodiment of the invention illustrated in FIGS. 5 to 9 includes a hopper, housing, and drive mechanism of the same type as described above in connection with FIGS. 1 to 4, but not shown in FIGS. 5 to 9 for the sake of clarity. While the assembled group or unit G is broken in the first example of our apparatus by causing the several elements of the group to travel in parallel paths at different speeds, the modified apparatus shown in FIGS. 5 to 9 causes the group elements to travel in diverging paths.

Figure 5:
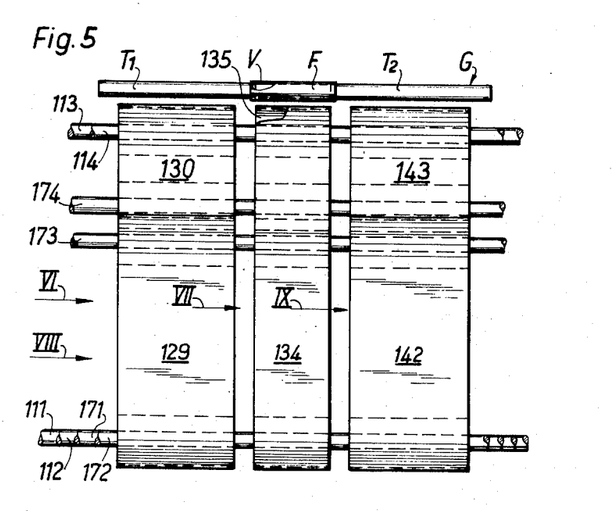
FIGS. 5 shows working elements of a modification of the device of FIG. 1 without supporting structure or drive, the view being in front elevation.

Four driven shafts 111, 112, 171, 172 and four idler shafts 113, 114, 173, 174 are arranged in such a manner that their axes are parallel. The axes of the four driven shafts are in a common horizontal plane, those of the drive shaft 111 and of the idler shafts 113, 173 in a first vertical plane, and those of the drive shaft 112 and of the idler shafts 114, 174 in a second vertical plane. The idler shafts 113, 114 are mounted in a common horizontal plane above the shafts 173, 174, and the idler shaft 174 is arranged slightly higher than the idler shaft 173.

Figure 6:
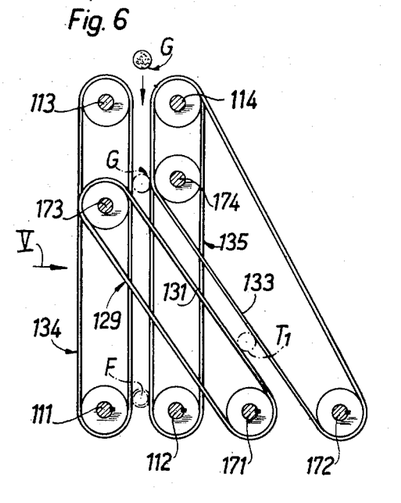
FIG. 6 shows the apparatus of FIG. 5 as viewed in side elevation in the direction of the arrow VI in FIG. 5.

Two sets of wide rollers are arranged on some shafts in two axial regions near the respective axial ends of the shafts, and a set of narrow rollers is arranged in a central axial region. FIG. 6 shows the rollers with the belts trained over them in a side elevational view taken in the direction of the arrow VI in FIG. 5. Because the several rollers and belts obscure each other in FIG. 6, a clearer understanding of the roller and belt arrangments will be had from FIGS. 7, 8, and 9 which respectively give side elevational views of the belt systems of individual regions with the associated shafts. The regions of wide rollers and belts associated with the terminal shaft portions and the tobacco bodies $T_1$, $T_2$ of the assembled groups or units G are respectively illustrated in FIGS. 8 and 9 in side elevational views taken in the direction of the arrows VIII and IX in FIG. 5. The central region of narrow rollers and belts conveying the filter plugs F is seen in FIG. 7 in a corresponding view.

Figures 2A, 9:
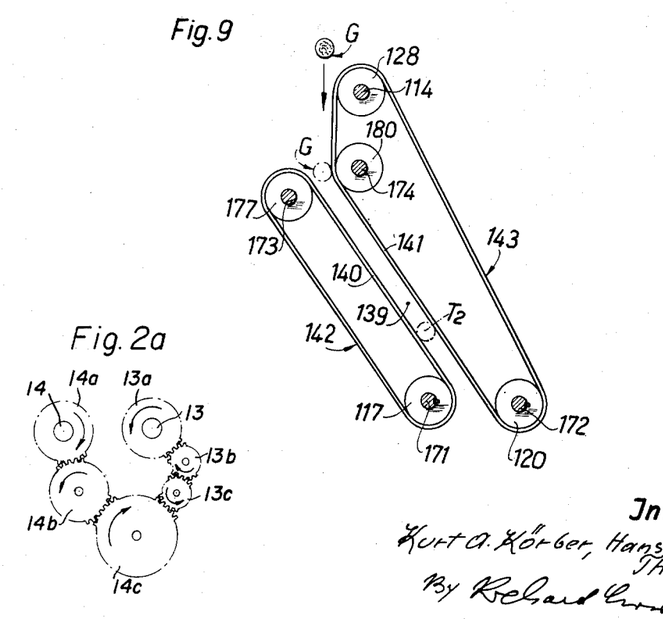
FIG. 2a is a diagrammatic view of a modified drive which may be utilized in an apparatus similar to the one shown in FIGS. 1 and 2.
FIG. 9 shows yet another portion of the apparatus of FIG. 5 in a side elevational view taken in the direction of the arrow IX.
Figure 3:
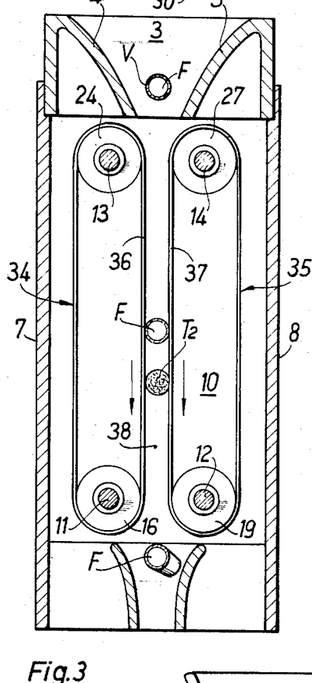
FIG. 3 shows the apparatus of FIG. 1 in side elevational section on the line III—III.
Figure 4:
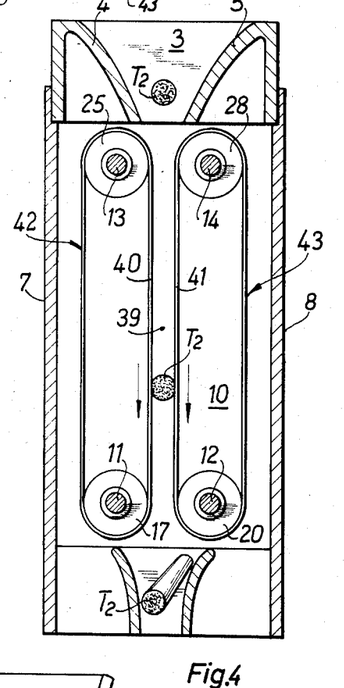
FIG. 4 illustrates the same apparatus in section on the line IV—IV.
Figure 7:
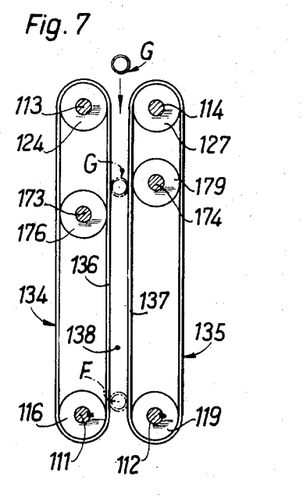
FIG. 7 is a side elevational view of a portion of the apparatus of FIG. 5 taken in the direction of the arrow VII.
Figure 8:
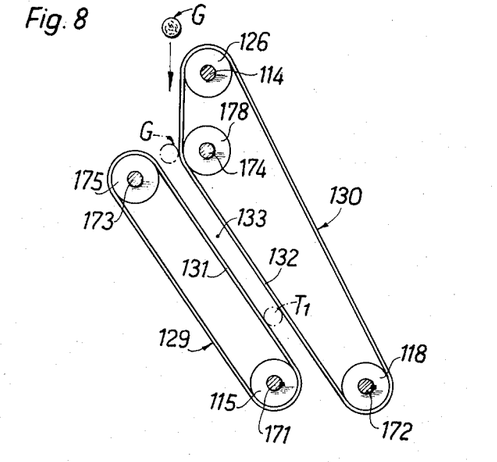
FIG. 8 shows another portion of the apparatus of FIG. 5 as viewed in the direction of the arrow VIII.

It is evident from joint consideration of FIGS. 7 to 9 that the driven shaft 111 carries only a narrow roller 116. The roller is keyed to the shaft. Shaft 112 similarly carries a keyed narrow roller 119. Shafts 171 and 172 each carry two axially spaced wide rollers 115, 117 and 118, 120. The idler shaft 113 carries a single narrow idler roller 124, and a similar roller 127 is mounted on the idler shaft 114 between two wider idler rollers 126, 128. The idler shafts 173, 174 each carry two wide rollers 175, 177; 178, 180, and a narrow roller 176, 179.

A flat belt 134 is trained over the narrow rollers 116, 124 (FIG. 7) and passes tangentially over the roller 176. A belt 135 is trained over the narrow rollers 119, 127 and passes over the roller 179. The descending runs 136, 137 of the belts 134, 135 define a channel 138 which is slightly narrower than the diameter of the filter plugs F, and descends vertically in a straight line from the area of contact of a unit G with the belt system illustrated in FIGS. 5 to 9.

Flat wide belts 129, 142 are respectively trained over pulleys 115, 175 and 117, 177. A wide belt 130 is trained in a triangular course over the wide rollers 118, 126, and 178. A belt 143 follows a similar course over the rollers 120, 128, and 180. The belts 130, 143 thus each have a short vertical descending run in a common plane with a corresponding portion of the run 137 of belts 135, and respective obliquely inclined runs 132, 141 opposite corresponding obliquely descending runs 131, 140 of the belts 129, 142 with which they define oblique conveying channels 133, 139.

The shafts 111, 112, 171, 172 will be understood to be driven at uniform speeds by a spur gear arrangement analogous to that shown in FIG. 2, and to transmit uniform speed to all rollers mounted thereon, so that all conveying belts travel at equal speed.

The embodiment of the invention illustrated in FIGS. 5 to 9 operates as follows:

An assembled group G of filter cigarette elements is dropped between the idler shafts 113, 114 and is gripped between the descending run 136 of the belt 134 on one side, and respective descending runs of the three belts 130, 135, 143 on the other side. The tobacco bodies $T_1$, $T_2$ eventually abut against the descending runs 131, 140 of the belts 129, 142, and are diverted into the oblique channels 133, 139 while the filter plugs F continue straight down through the channel 138. The tobacco bodies $T_1$, $T_2$ are severed from the filter plugs by shearing forces applied transversely of the longitudinal axes of the several filter cigarette elements in the manner described above, and are discharged in different locations from the breaking and sorting apparatus constituted by the belts.

In the two embodiments of the invention described so far, the two belt runs which jointly define a conveying channel for elements of a filter cigarette move at equal speeds. While such an arrangement is preferred because of its simplicity, and because it has been found to provide adequate shearing forces for separating the elements of a filter cigarette assembly group, it will be appreciated that different belt speeds within each individual channel are readily available by suitable selection of the gear wheels which transmit motion from a common drive to the several driven rollers. If the two belt runs jointly constituting a channel run at different speeds, a group element clamped between the belt runs is rotated about its axis during its translatory movement, and the several elements of the group may be severed by torsional forces superimposed on or substituted for the shearing forces which result in both devices described from the equal speeds of the belts in each channel. For example, and as shown in FIG. 2a, the shafts 13, 14 may carry driven spur gears 13a, 14a, which respectively mesh with intermediate gears 13b, 14b of different diameters. The gear 13b meshes with a second intermediate gear 13C, and the gears 13c, 14b mesh with a driver gear 14c. It will be noted that, when the driver gear 14c rotates, the shafts 13, 14 will rotate at different speeds.

The devices illustrated in FIGS. 1 to 9 and described hereinabove may readily be modified for separating assembled cigarette element groups different from those discussed hereinabove. The groups referred to so far constitute an intermediate product in the manufacture of filter cigarettes in which the tobacco bearing portions of two cigarettes are joined by a filter plug having twice the length of the filter of the finished cigarette. This intermediate product is conventionally split in half at a splitting station. It has so far been assumed that the inspection station from which defective assembled groups are diverted to the hopper 1 is arranged ahead of the splitting station so that the breaking and sorting apparatus of the invention operates on such assembled groups.

Figure 10:
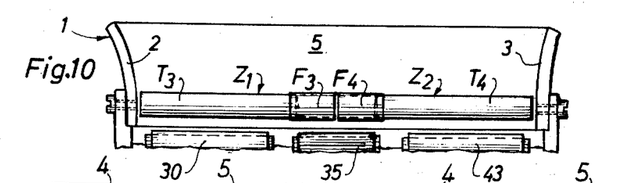
FIG. 10 illustrates the use of the apparatus of FIG. 1 for a modified purpose.

If it is desired to arrange the inspection station after the splitting station, the apparatus of the invention is readily modified to handle split groups at any stage of further processing if such modification should be necessary. As seen in FIG. 10, the apparatus illustrated in FIGS. 1 to 4 can handle assembled groups which have been split into two filter cigarettes $Z_1$, $Z_2$ without any modification if the cigarettes are still positioned so that the axes of their tobacco bodies $T_3$, $T_4$ and of their filter mouthpieces $F_3$, $F_4$ substantially coincide. The descending runs 36, 37 of the belts 34, 35 grip both filter mouthpieces $F_3$, $F_4$, and the cigarettes are broken in substantially the same manner as the assembled groups G.

After leaving the splitting station, the cigarettes form two continuous branch streams one of which may be turned over and combined with the other branch stream in such a manner that all filters of the resulting combined stream are on the same side.

Figure 11:
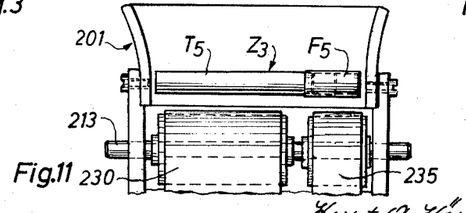
FIG. 11 shows an embodiment of the invention closely related to that seen in FIG. 1, and in a corresponding view.

Cigarettes diverted from the combined stream by an inspection device are preferably broken and sorted into a tobacco bearing portion and a portion substantially free from tobacco in a modified version of the apparatus of FIGS. 1 to 4 illustrated in FIG. 11. The apparatus of FIG. 11 is essentially one-half of the device shown in FIGS. 1 to 4. A hopper 201 similar to the hopper 1 is dimensioned to have a bottom orifice corresponding to the size of a cigarette $Z_3$ consisting of a paper covered tobacco body $T_5$ and a filter mouthpiece $F_5$. Respective pairs of conveyor belts of which only individual members 230, 235 are seen in FIG. 11 are arranged under the orifice of the hopper 201 to respectively receive the tobacco body $T_5$ and the filter mouthpiece $F_5$, and to convey them downward at different speeds in the manner discussed in detail with reference to FIGS. 1 to 4. The drive and support mechanism which positions and actuates the belts is represented merely by the idler shaft 213, but will be understood to be analogous to the arrangement shown in FIGS. 1 to 4. It is evident that the apparatus of FIGS. 5 to 9 may be similarly modified to consist of only one set of wide rollers and of a set of narrow rollers having substantially one-half the width of the narrow rollers illustrated in FIGS. 5 to 9. The mode of operation of these modified embodiments of the invention will be obvious to those skilled in the art, and does not require further description.

While the several embodiments of the invention discussed so far have been described with reference to paper wrapped rod-shaped bodies of tobacco joined to filter plugs or filter mouthpieces, the apparatus of the invention is not limited to any specific type of cigarettes, nor is it necessarily limited to cigarettes as such. The functions of the working elements of the specific examples of the invention disclosed hereinabove are not affected by the presence or absence of a paper envelope on the tobacco bodies, nor by the structure of the tobacco body itself. It is entirely within the province of an expert mechanic to modify dimensional relationships of the apparatus to make it suitable for breaking cigars or cigarillos equipped with mouthpieces. The nature of the non-tobacco elements of the assemblies to be broken is virtually without effect on the basic features of our apparatus. The filter mouthpiece $F_5$ has been shown to consist of two axially juxtaposed elements which may differ in their composition without materially altering the mode of operation of our apparatus. Actually, the mouthpiece need not contain any filtering element, and it may be secured to the tobacco portion of the assembly by means other than an adhesively attached paper sleeve.

Figures 12, 13:
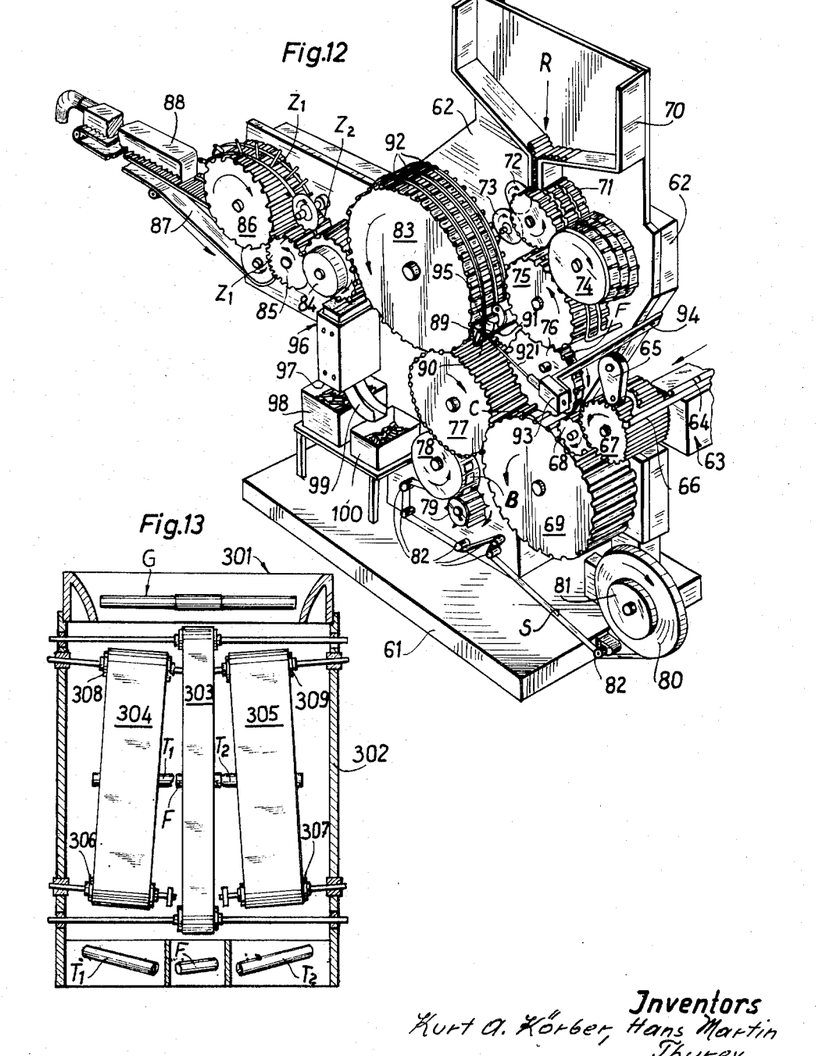
FIG. 12 is a perspective partial view of a machine for making filter cigarettes showing a known automatic inspection device for removing rejected assembled groups or units of tobacco bodies and double filter plugs from the machine and for feeding them to the breaking and sorting device of the invention.
FIG. 13 shows yet another embodiment of the invention in a front-elevational partly sectional view.

FIG. 12 shows the cooperation of the breaking and sorting device illustrated in detail in FIGS. 1 to 4 with other parts of a filter cigarette machine equipped with an inspection station of the type disclosed more fully in the commonly owned copending application Serial Number 208,189 filed on July 5, 1962 by Heinz Kaeding and Konrad Schmalz.

The machine is mounted on a foundation 61 and includes a supporting casing of which only one wall 62 is shown. The individual paper wrapped tobacco bodies are made in a known manner on a cigarette making machine section 63 of which only the discharge end 64 of an output conveyor is illustrated. A crank mounted feeder slide 65 delivers two tobacco bodies at a time to each of the holders 66 of a tobacco body magazine or storage drum 67. The tobacco bodies are transferred from the magazine drum 67 by way of an intermediate drum 68 to a group or unit assembly drum 69 on which a double filter plug is inserted between each pair of cigarettes. The double filter plugs are received by the assembly drum 69 from a filter cutting and rearranging device disposed thereabove. This filter cutting and rearranging device generally includes a magazine 70 containing filter rods R which are delivered successively to a filter cutting drum 71 having two rotary cutters 72, 73 associated therewith so that each filter rod R is cut into three double filter plugs F. The three filter plugs F thus cut from each filter rod are transferred to a rearranging unit 74 consisting of three filter realigning disks which cooperate with a filter plug drum 75 on which the filter plugs are brought into the same plane of rotation. The filter plugs which are brought into alignment in the same plane of rotation are transferred to the assembly drum 69 by way of a grooved wheel 76 which is axially centered with respect to the latter.

The groups assembled on drum 69 and each including a pair of tobacco bodies C with a double filter plug F therebetween, are transferred to a group assembly closing drum 77 having guide devices at its opposite sides by which the tobacco bodies and filter plugs are moved axially together.

The device for supplying the sheets of gummed paper or other wrapping material from which the sleeves V for connecting the tobacco bodies and filter plugs are formed is mounted below the assembly closing drum 77 and generally includes a holder 81 for a reel 80 from which a continuous strip S of the gummed paper is unwound. The strip S passes around reversing rollers 82 before passing between a cutter drum 79 and a backup drum 78 which cooperate to cut the strip S into sections or sheets B carried on the periphery of the drum 78 and transferred from the latter to the assembly closing drum 77 after the reception by the latter of the filter and tobacco body groups from the assembly drum 69.

The filter and tobacco body groups with the sheets for forming the connecting sleeves are successively transferred from drum 77 to a rolling drum 83 having guides 92 extending therearound and cooperating with a counter member 95 to roll the sheets of gummed paper or wrapping material into sleeves connecting each double filter plug F to the adjacent ends of the related pair of tobacco bodies C thereby forming a double filter cigarette unit. As disclosed more fully in the copending application for United States Letters Patent, Serial Number 208,030 filed on July 6, 1962 by Heinz Kaeding, an incising or notching device may be mounted immediately below the counter member 95 and includes blades 89 in holders 90 which are rockably mounted and connected by a shaft 91 so that the blades 89 will simultaneously notch or cut into the tobacco bodies of each unit passing thereby when the blades 89 are moved towards the surface of drum 83 by a control rod 92′ extending between one of the holders 90 and the armature of a solenoid 93 carried by a bracket 94. The solenoid 93 may be energized only during initial operation of the filter cigarette making machine so as to indicate those filter cigarette units which are produced during such initial operation and therefore are defective by reason of the drying out of the adhesive on the gummed sheets forming the connecting sleeves thereof.

The filter cigarette units are successively transferred from the rolling drum 83 to a testing or inspection drum 84 described in detail in the aforementioned copending application Serial No. 208,189. It generally operates to discard or eject defective filter cigarette units into an underlying breaking and sorting apparatus 96. The remaining or satisfactory filter cigarette units are transferred from the testing apparatus 84 to a cutting drum 85 on which each filter cigarette unit is cut at its center to form two filter cigarettes. Since the filter cigarettes cut from each unit extend in opposite directions, and are arranged side by side, the filter cigarettes are transferred from the cutting drum 85 to a reversing drum 86 on which the filter cigarettes are arranged in a row, that is, aligned circumferentially with the filtered ends thereof all extending in the same direction prior to being deposited on a single row take-off conveyor belt 87 running below the drum 86. A suction device 88 is disposed above the conveyor belt 87 for removing layers or rows of cigarettes therefrom and for transferring such layers of cigarettes into cigarette storage trays or other suitable containers.

The defective assembled groups or filter cigarette units ejected downwardly from the inspection drum 84 by blasts of air emitted through radial channels in the drum 84, not visible in the drawing, are dropped into the hopper of the breaking and sorting apparatus 96. The housing 97 of the apparatus contains one of the belt systems illustrated respectively in FIGS. 1 to 4, 5 to 9, 13, 14 and 15, 16 and 17, and 18 and 19. The tobacco bodies separated from the tobacco-free cigarette elements are dropped into a container 98, whereas the filter plugs or mouthpieces substantially free from tobacco are guided by a chute 99 into a receptacle 100.

The breaking and sorting device illustrated in FIG. 13 consists of a hopper 301 mounted on top of a housing 302, of a system of belts arranged in the housing in a manner similar to that illustrated in FIGS. 1 to 9, and of a drive mechanism for actuating movement of the belts. The hopper 301 is closely similar to that shown in FIGS. 1, 3, and 4 and guides assembled groups or units G to the belt system within the housing 302. A pair of relatively narrow central belts of which only one belt 303 is shown provides a conveyor duct through which the filter plugs F are passed vertically downward to be discharged into a non-illustrated receptacle in the manner described above.

The tobacco bearing bodies $T_1$ and $T_2$ of the unit G are gripped by two pairs of relatively wide belts of which only respective members 304, 305 are seen in the drawing. The belt 304 is trained over a driven roller 306 and an idler roller 308 whose axes are parallel but inclined at a small angle with respect to a horizontal position. The belt 305 is supported in the same manner on rollers 307 and 309, and the respective second members of each pair of belts will be understood to be mounted in an analogous manner to provide two conveying channels for the tobacco bodies $T_1$, $T_2$ which diverge downwardly from each other and from the narrower channel one wall of which is constituted by the belt 303.

If the belts 304, 305 are driven at substantially the same speed as the belt 303, an assembled group G is torn apart by forces acting in the direction of the longitudinal axis of the group. Depending on the nature of the defect for which the group or unit G is being rejected, such axial displacement of the several constituent elements of the group may be entirely satisfactory. It is effective if the connecting sleeve V and its adhesive bonds with the several group elements constitute the weakest portions of the assembled unit. Axially applied forces will cleanly separate the filter plug from the tobacco bodies under such conditions. If the mechanically weakest portion of the group is within the filter plug or within one of the tobacco bodies, we prefer to drive the belt 303 and its non-illustrated companion belt at a speed different from that of the belts 304, 305, and to superimpose radial and/or torsional forces upon the axial forces generated by the divergent paths of the several belt pairs. The means for rotating the belts 304, 305 and 303 at different speeds will be analogous to the arrangement shown in FIG. 2a.

Figures 14, 16:
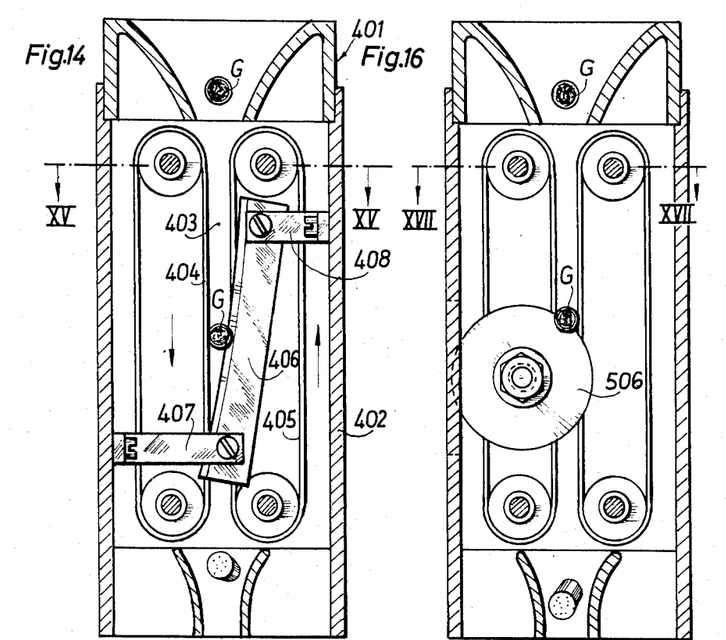
FIG. 14 is a side elevational sectional view of a further embodiment of the invention.
FIG. 16 illustrates a modification of the apparatus of FIG. 14 in a corresponding view.
Figures 15, 17:
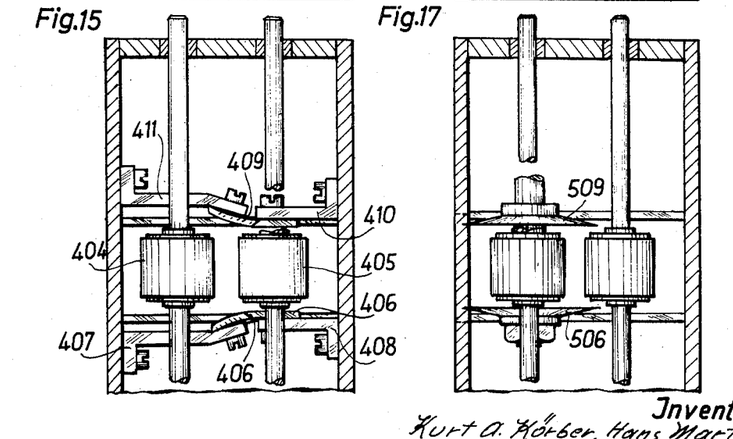
FIG. 15 shows the apparatus of FIG. 14 in plan section on the line XV—XV.
FIG. 17 illustrates the apparatus of FIG. 16 in sectional plan view on the line XVII—XVII.

The embodiment of the invention illustrated in FIGS. 14 and 15 differs from those described hereinbefore by being equipped with a single pair of conveying belts 404, 405 arranged under a hopper 401 in a housing 402. The belts 404, 405 are positioned to grip the filter plug of an assembled group G and to carry it downward through a channel 403. Brackets 407, 408 fastened to opposite walls of the housing 402 on different levels support a stationary cutting blade 406. The cutting edge of the blade extends obliquely adjacent one side of the channel 403 to sever a tobacco body from the filter plug conveyed between the belts 404, 405. A blade 409 is mounted on the other side of the channel 403 in a corresponding manner on brackets 410, 411. The two blades 406, 409 diverge downwardly from each other and from the channel 403 so that axial forces are combined with the radial cutting forces exerted by the blades to separate the several elements of the group G as it is moved downward by the belts 404, 405. The filter plugs are discharged separately from the tobacco bodies in a manner not further illustrated and evident from the preceding description of other examples of this invention.

The modified breaking and sorting apparatus illustrated in FIGS. 16 and 17 in elevational section and in plan section respectively differs from that shown in FIGS. 14 and 15 by driven rotary cutters 506, 509 mounted on a common shaft in such a manner that their cutting edges respectively extend obliquely across the sides of the conveying channel. The rotary cutters are of conical shape. The freshly cut surfaces of the tobacco bodies are moved along the conical cutter surfaces in a direction which has a radially inward component whereby axial forces are exerted on the tobacco bodies tending to move them away from the filter plug.

Figure 18:
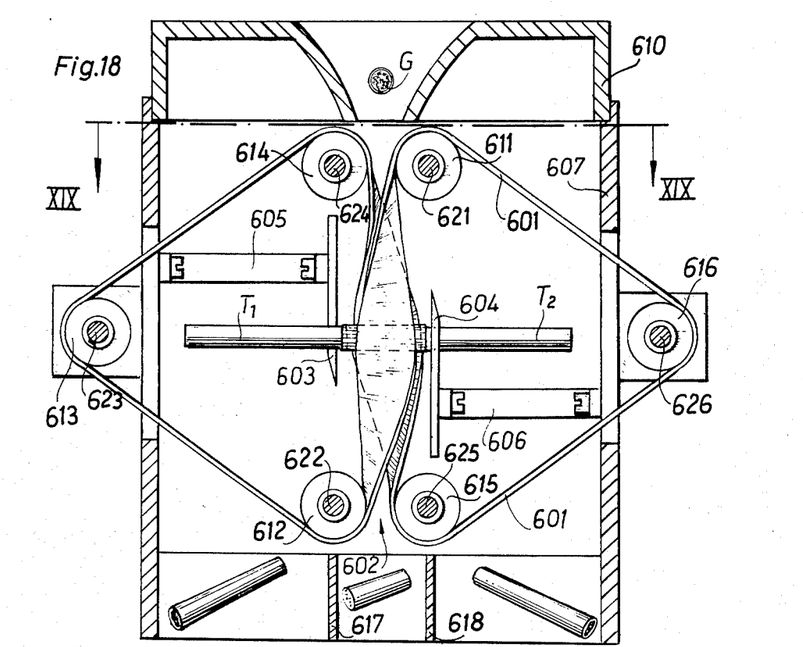
FIG. 18 shows an additional embodiment of the invention in side elevational sectional view.
Figure 19:
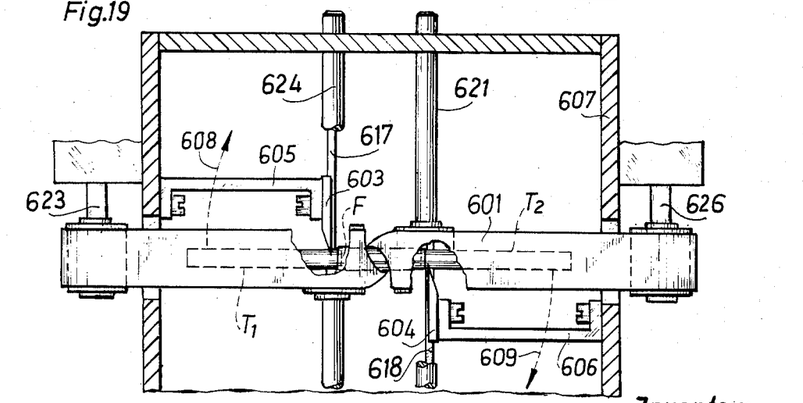
FIG. 19 is a fragmentary plan view of the device of FIG. 18 taken in section on the line XIX—XIX.

FIGS. 18 and 19 show an additional embodiment of the breaking and sorting apparatus of the invention which employs but a single, relatively narrow conveying belt 601. The belt is trained over six rollers 611 to 616 mounted on respective parallel shafts 621 to 626. The idler rollers 613 and 616 are mounted on shafts 623, 626 outside the housing 607 which encloses the driven rollers 611, 612, 614, 615, and may be equipped with tensioning means in a conventional manner. The rollers 611, 614 define therebetween the top entrance of a conveying channel 602 which ends between the rollers 612, 615. The channel 602 extends downward from the orifice of a hopper 610 toward a sorting device of which only two partition walls 617, 618 are illustrated.

The belt 601 moves sequentially over the rollers 611 to 616, and the channel 602 extends between the vertical runs of the belt which respectively extend from the roller 611 to the roller 612, and from the roller 614 to the roller 615. Each vertical run of the flat belt 601 is twisted 180 degrees so that the two runs are approximately parallel and equidistant over the entire length of the channel 602 which itself is twisted.

Two cutting blades 603, 604 whose cutting edges extend vertically are mounted between the rollers 612, 614 and 611, 615 respectively, and are aligned with the partition walls 617, 618.

An assembled group G discharged from the orifice of the hopper 610 enters the entrance of the channel 602 between the rollers 611, 614, and is conveyed downward by the vertical runs of the belt 601. The group G is simultaneously rotated about a vertical axis so that the tobacco bodies $T_1$, $T_2$ move in the direction of the arrows 608, 609 seen in FIG. 19. The cutting edges of the blades 603, 604 engage the portions of the tobacco bodies closely adjacent the filter plug F and sever them from the plug. The blades are ground in such a manner as to displace the tobacco bodies in the direction of the group axis during the cutting operation so that they may be collected separate from the filter plug F which travels with the belt to the lower end of the channel 602 and is dropped in a duct formed between the partition walls 617, 618.

The belt 601 is driven at a speed sufficiently high to sever the major portions of the tobacco bodies $T_1$, $T_2$ from the filter plug F although only the plug is being held by the belt 601. The tobacco bodies are not backed by any abutting member, yet a clean cut is readily achieved. If contamination of the reclaimed tobacco by portions of the filter is to be avoided, it is necessary to cut through the tobacco bodies so that a minor amount of tobacco fibers remains on the filter plug. At the high operating speed of which the apparatus is capable, the centrifugal forces generated during the twisting downward movement of the filter plug are sufficient to dislodge a substantial portion of such residual tobacco fibers from the plug and to throw them outward beyond range of the partitions 617, 618 to be further processed with the cutoff portions of the tobacco bodies.

It should be understood of course that the foregoing disclosure relates to only preferred embodiments of the invention, and that it is intended to cover all changes and modifications of the examples of the invention herein described for the purpose of the disclosure which do not constitute departures from the spirit and scope of the invention set forth in the appended claims.

What we claim is:

1. In a method of reclaiming tobacco from defective assemblies of the type including an elongated tobacco bearing portion and an aligned tobacco-free portion, the steps of:
   (a) guiding a plurality of assemblies in a predetermined path extending through a testing station to determine the presence of defective assemblies;
   (b) diverting defective assemblies from said path and guiding the same directly to a breaking station;
   (c) breaking each defective assembly completely transversely through the assembly at said breaking station while moving at least one of the portions of each defective assembly transversely of its length so that the tobacco bearing portion is separated from the tobacco-free portion of the respective assembly including holding the tobacco-free portions during separation of the corresponding tobacco bearing portions; and (d) collecting the thus separated tobacco bearing portions.

2. The steps as set forth in claim 1, wherein said path extends in a direction perpendicular to the direction of elongation of said assemblies, each defective assembly being diverted from said path in a direction of ejection which is also perpendicular to the direction of elongation of said assemblies.

3. The steps as set forth in claim 2, wherein said defective assemblies are broken at said breaking station while advancing in said direction of ejection.

4. The steps as set forth in claim 1, wherein the tobacco bearing portions of defective assemblies are moved relative to tobacco-free portions at said breaking station for breaking the defective assemblies.

5. The steps as set forth in claim 1, wherein the tobacco-free portion of each defective assembly is conveyed from said testing station to said breaking station for guiding the respective defective assembly, and wherein the tobacco bearing portion of each defective assembly is severed from said tobacco-free portion at said breaking station while said tobacco-free portion is being conveyed.

6. The steps as set forth in claim 1, wherein the portions of each defective assembly are moved relative to each other at said breaking station in a direction of elongation of the respective defective assembly.

7. The steps as set forth in claim 1, said portions of said defective assembly being moved relative to each other at said breaking station in a direction transverse of the direction of elongation of said defective assembly for breaking said assembly.

8. The steps as set forth in claim 1, wherein portions of each defective assembly are moved at said breaking station in a direction away from said testing station and at different speeds whereby the defective assemblies are broken into said portions.

9. The steps as set forth in claim 1, wherein portions of each defective assembly are moved at said breaking station away from said testing station and in different directions, whereby the defective assemblies are broken into said portions.

10. In an apparatus for reclaiming tobacco from defective assemblies of the type including an elongated tobacco bearing portion and an aligned tobacco-free portion, in combination:

(a) first guide means for guiding a plurality of assemblies in a predetermined path;

(b) testing means adjacent to and arranged to divert defective assemblies from said path;

(c) second guide means for guiding diverted assemblies to a breaking station;

(d) breaking means at said breaking station arranged to break completely transversely through defective assemblies so as to separate tobacco bearing portions from tobacco-free portions including first conveying means for holding tobacco-free portions during separation from the corresponding tobacco bearing portions and including moving means for moving at least one of the portions of the defective assembly transversely of its length during breaking; and (e) collecting means for collecting the thus separated tobacco bearing portions.

11. A combination as set forth in claim 10, wherein said breaking means further include second conveying means for engaging the tobacco bearing portions of defective assemblies and for moving such tobacco bearing portions relative to the corresponding tobacco-free portions whereby the defective assemblies are broken.

12. A combination as set forth in claim 11, wherein said breaking means further include drive means for moving said first and second conveying means at different speeds.

13. A combination as set forth in claim 11, wherein said first and second conveying means are operative to convey said tobacco bearing portions and said tobacco-free elements of defective assemblies in diverging paths.

14. An apparatus as set forth in claim 10, wherein said first conveying means is arranged to convey the tobacco-free portions of defective assemblies in a predetermined direction and to rotate the same about an axis extending in said predetermined direction while the tobacco bearing portions freely project from the tobacco-free portions; and cutting means for engaging the tobacco bearing portions during rotation of defective assemblies and for severing the tobacco bearing portions from the corresponding tobacco-free portions.

15. An apparatus as set forth in claim 10, wherein said first conveying means is arranged to convey the tobacco-free portions of defective assemblies in a predetermined direction while the corresponding tobacco bearing portions freely project from the tobacco-free portions; and cutting means engageable with the tobacco bearing portions during the conveying of defective assemblies for severing the tobacco bearing portions from the corresponding tobacco-free portions.

16. An apparatus as set forth in claim 15, wherein said cutting means include a stationary cutting blade engaged by the tobacco bearing portions during said conveying of defective assemblies, said cutting blade having an elongated cutting edge portion obliquely extending relative to said predetermined path.

17. An apparatus as set forth in claim 16, wherein said cutting blade is elongated in a direction obliquely away from the tobacco-free portions of defective assemblies.

18. An apparatus for breaking defective assemblies of the type including an elongated tobacco bearing portion and an aligned tobacco-free portion, comprising guide means arranged to advance defective assemblies in a direction which is substantially perpendicular to the longitudinal extensions of said assemblies; a pair of conveyors defining a channel arranged to receive said tobacco-free portions of defective assemblies and having a width less than the transverse dimensions of said tobacco-free portions; drive means arranged to move at least one of said conveyors so as to advance said tobacco-free portions in said channel; and breaking means arranged to detach said tobacco bearing portions from said tobacco-free portions while said tobacco-free portions advance in said channel.

19. An apparatus as set forth in claim 18, wherein said breaking means comprises a second pair of conveyors defining a second channel arranged to receive said tobacco bearing portions and having a width less than the thickness of said tobacco bearing portions, and drive means arranged to move at least one of said second pair of conveyors at such a speed that said tobacco bearing portions move relative to said tobacco-free portions whereby said tobacco bearing portions are automatically separated from said tobacco-free portions.

20. An apparatus as set forth in claim 18, wherein said breaking means comprises a second pair of conveyors defining a second channel arranged to receive said tobacco bearing portions and having a width less than the thickness of said tobacco bearing portions, and drive means arranged to drive at least one of said second pair of conveyors, said first and second channels being arranged to move the respective portions in diverging paths whereby said tobacco bearing portions are automatically separated from said tobacco-free portions.

21. An apparatus as set forth in claim 20, wherein said channels diverge in the axial direction of defective assemblies.

22. An apparatus as set forth in claim 20, wherein said channels diverge in a direction substantially at right angles to the longitudinal extensions of defective assemblies.

23. An apparatus as set forth in claim 18, wherein said breaking means comprises a cutter adjacent to said channel and arranged to sever said tobacco bearing portions from said tobacco-free portions.

24. An apparatus as set forth in claim 18, wherein said channel defines a substantially helical path whereby said tobacco-free portions are subjected to the action of centrifugal force which separates therefrom at least some such particles of tobacco which might have adhered thereto upon separation of said tobacco bearing portions.

25. In an apparatus for reclaiming tobacco from defective assemblies of the type including an elongated tobacco bearing portion and an elongated tobacco-free portion, in combination, first guide means for guiding a plurality of assemblies in a predetermined path; testing means adjacent to and arranged to divert defective assemblies from said path; second guide means for guiding diverted assemblies to a breaking station; breaking means at said breaking station arranged to break defective assemblies so as to separate tobacco bearing portions from tobacco-free portions, said breaking means including a plurality of conveying means respectively engaging said tobacco bearing portions and said tobacco-free portions of defective assemblies for moving said tobacco bearing portions and said tobacco-free portions relative to each other whereby the defective assemblies are broken, each of said conveying means including two belt means normally spaced from each other a distance smaller than a corresponding dimension of a defective assembly and actuating means for moving said two belt means in substantially parallel paths, said second guide means including means for orienting defective assemblies in such a manner that said dimensions thereof extend between said belt means whereby the defective assemblies are gripped between said belt means; and collecting means for collecting the thus separated tobacco bearing portions.

26. An apparatus for breaking defective assemblies of the type including an elongated tobacco bearing portion and an aligned tobacco-free portion, comprising guide means arranged to advance only defective assemblies in a direction which is substantially perpendicular to the longitudinal extensions of said assemblies; conveying means for receiving and holding the tobacco-free portions of defective assemblies advanced by said guide means and for advancing such tobacco-free portions in a predetermined path; and breaking means arranged to break completely transversely through the defective assemblies so as to detach the tobacco bearing portions from the corresponding tobacco-free portions while the tobacco-free portions are held and advanced by said conveying means.

27. In a method of reclaiming tobacco from defective assemblies of the type including an elongated tobacco bearing portion and an aligned tobacco-free portion, the steps of guiding a plurality of assemblies in a predetermined path extending through a testing station to determine the presence of defective assemblies; diverting defective assemblies from said path and guiding the same directly to a breaking station; breaking completely transversely through each defective assembly at said breaking station including moving the tobacco bearing portions and the tobacco-free portions in the same plane but at different speeds so that the tobacco bearing portions are separated from the corresponding tobacco-free portions and simultaneously holding the tobacco-free portions during movement in said plane; and collecting the thus separated tobacco bearing portions.

28. In a method of reclaiming tobacco from defective assemblies of the type including an elongated tobacco bearing portion and an aligned tobacco-free portion, the steps of guiding a plurality of assemblies in a predetermined path extending through a testing station to determine the presence of defective assemblies; diverting defective assemblies from said path and guiding the same directly to a breaking station; breaking completely transversely through each defective assembly at said breaking station including moving the tobacco bearing portions and the tobacco-free portions in the same plane but in different directions so that the tobacco bearing portions are separated from the corresponding tobacco-free portions and holding the tobacco-free portions during movement in said plane; and collecting the thus separated portions.

29. In an apparatus for reclaiming tobacco from defective assemblies of the type including an elongated tobacco bearing portion and an aligned tobacco-free portion, in combination: first guide means for guiding a plurality of assemblies in a predetermined path; testing means adjacent to and arranged to divert defective assemblies from said path; second guide means for guiding the thus diverted defective assemblies to a breaking station; breaking means at said breaking station including a plurality of conveying means respectively engaging said tobacco bearing portions and said tobacco-free portions of defective assemblies for holding and for simultaneously moving said tobacco bearing portions and said tobacco-free portions in the same plane of movement but at different speeds whereby each defective assembly is broken completely transversely through the respective assembly; and collecting means for collecting the thus separated tobacco bearing portions.

30. In an apparatus for reclaiming tobacco from defective assemblies of the type including an elongated tobacco bearing portion and an aligned tobacco-free portion, in combination: first guide means for guiding a plurality of assemblies in a predetermined path; testing means adjacent to and arranged to divert defective assemblies from said path; second guide means for guiding the thus diverted defective assemblies to a breaking station; breaking means at said breaking station including a plurality of conveying means respectively engaging said tobacco bearing portions and said tobacco-free portions of defective assemblies for holding and for simultaneously moving said tobacco bearing portions and said tobacco-free portions in the same plane of movement but in different directions whereby each defective assembly is broken completely transversely through the respective assembly; and collecting means for collecting the thus separated tobacco bearing portions.

References Cited by the Examiner

UNITED STATES PATENTS

| | | | |
|---|---|---|---|
| 2,815,029 | 12/1957 | Exner | 131—96 X |
| 2,951,364 | 9/1960 | Sherrill. | |
| 2,976,872 | 3/1961 | Morphet et al. | 131—96 |
| 3,026,880 | 3/1962 | Perrin | 131—96 |
| 3,036,581 | 5/1962 | Dearsley | 131—94 |

FOREIGN PATENTS

| | | |
|---|---|---|
| 954,855 | 12/1956 | Germany. |
| 795,533 | 5/1958 | Great Britain. |
| 842,021 | 7/1960 | Great Britain. |

SAMUEL KOREN, *Primary Examiner.*